United States Patent [19]

Kido et al.

[11] Patent Number: 5,029,320
[45] Date of Patent: Jul. 2, 1991

[54] THIN FILM ELECTROLUMINESCENCE DEVICE WITH ZN CONCENTRATION GRADIENT

[75] Inventors: Fusayoshi Kido, Yokohama; Naotoshi Matsuda, Kawasaki; Hideo Yoshikawa, Yamato; Masaaki Tamatani, Fujisawa, all of Japan

[73] Assignee: Kabushiki Kaisha Toshiba, Kawasaki, Japan

[21] Appl. No.: 385,062

[22] Filed: Jul. 26, 1989

[30] Foreign Application Priority Data

Jul. 29, 1988 [JP] Japan .................................. 63-190213

[51] Int. Cl.$^5$ ..................... H01L 33/00; H01L 31/12; H01L 31/16; H01L 27/14
[52] U.S. Cl. ........................................ 357/17; 357/19; 357/30; 313/509
[58] Field of Search ..................... 313/509; 357/17, 19, 357/30 B, 30 D, 30 F, 30 L, 39 R

[56] References Cited

U.S. PATENT DOCUMENTS

| | | | |
|---|---|---|---|
| 3,975,661 | 8/1976 | Kanatani et al. | 357/17 |
| 4,602,192 | 7/1986 | Nomura et al. | 357/41 |
| 4,672,266 | 6/1987 | Taniguchi et al. | 357/10 |
| 4,855,249 | 8/1989 | Akasaki et al. | 148/DIG. 25 |
| 4,967,251 | 10/1990 | Tanaka et al. | 357/30 |

FOREIGN PATENT DOCUMENTS

| | | | |
|---|---|---|---|
| 62-79285 | 4/1987 | Japan | 357/30 B |
| 62-92868 | 4/1987 | Japan | 357/30 B |
| 62-218476 | 9/1987 | Japan | 357/30 B |

OTHER PUBLICATIONS

Weyrich et al., A Sample LPE Process for Efficient Red and Green GaP Diodes, Sept., 1974, pp. 145-154, 357* 17.
J. I. Pan Kove et al., GaN Yellow-Light Emitting Diodes, Jan. 1973, pp. 54-60, 357* 17.
J. I. Pankove, "Luminescence in GaN", J. Luminscence 7(1973), pp. 114-126.
R. F. Rutz, "Ultraviolet Electroluminescence in AlN", Appl. Phys. Lett., 28(7) (1976) 379.
S. Yoshida, S. Misawa, and S. Gonda, "Properties of Al$_x$Ga1-xN Films Prepared by Reactive Molecular Beam Epitaxy", J. Appl. Phys. 53(10) (1982), 6844.
F. Kido, H. Yoshikawa, "Thin Film EL Using Al$_x$Ga1-xN as Matrix", Extended Abstracts (The 36th Spring Meeting, 1989); The Japan Society of Applied Physics and Related Societies No. 3 (1989), 1065.

Primary Examiner—Jerome Jackson, Jr.
Assistant Examiner—Daniel Kim
Attorney, Agent, or Firm—Oblon, Spivak, McClelland, Maier & Neustadt

[57] ABSTRACT

A thin film electroluminescence device is disclosed which comprises are electrode formed on a transparatent substrate, one dielectric layer formed on the electrode, an emitting layer containing Group IIIb-Vb compound as a host material and positive trivalent element ions added as a luminescence center to the host material, the other dielectric layer formed on the emitting layer, the other electrode provided on the other dielectric layer.

2 Claims, 2 Drawing Sheets

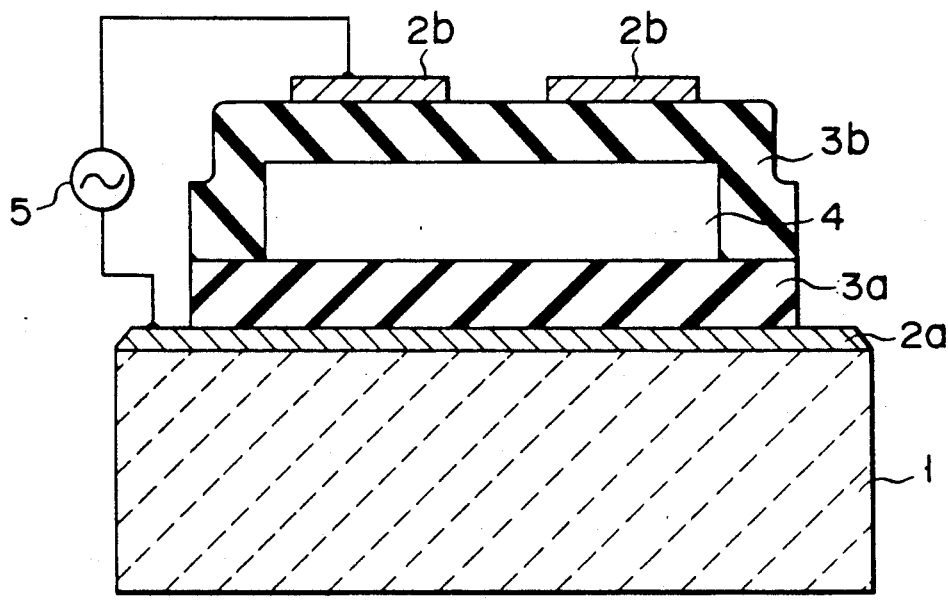
F I G. 1
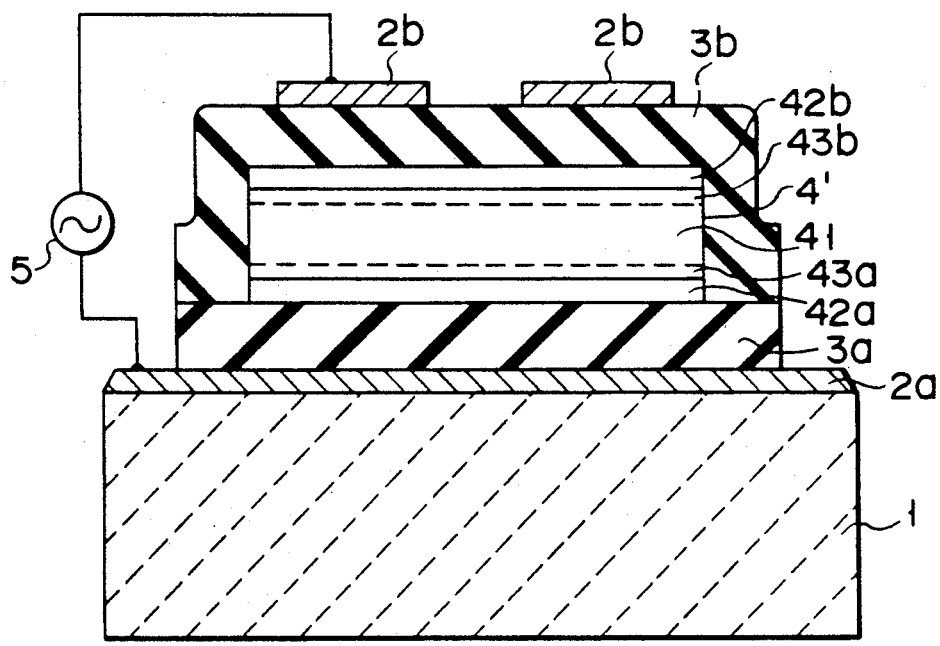
F I G. 2

THIN FILM ELECTROLUMINESCENCE DEVICE WITH ZN CONCENTRATION GRADIENT

BACKGROUND OF THE INVENTION

1. Field of the Invention

The present invention relates to a thin film electroluminescence (TFEL) device for use in a display device and an edge emitting for printer head.

2. Description of the Related Art

In general, the thin film electroluminescence (TFEL) device comprises one electrode formed on a transparent substrate, such as a glass sheet, an emitting layer sandwiched between two dielectric layers, and the other electrode formed over the emitting layer. The conventional emitting layer is composed of a host material and a luminescence center as given below.

TABLE 1

| host material | luminous center |  |  |  |
|---|---|---|---|---|
|  | red | green | blue | bluish green |
| ZnS | $Sm^{3+}$ | $Tb^{3+}$ | $Tm^{3+}$ |  |
| CaS |  | $Tb^{3+}$ |  | $Ce^{3+}$ |
| SrS | $Sm^{3+}$ |  |  | $Ce^{3+}$ |

In the aforementioned TFEL device, when a high electric field of a few MV/cm is applied to the emitting layer upon the application of a voltage between the associated electrodes, electrons are implanted into the emitting layer. At this time, the electrons are accelerated there under the aforementioned high electric field and hot electrons are generated. The hot electrons are migrated in the crystal of the host material of the emitting layer, causing them to directly collide with the element ions acting as the luminescence center present in the host material or causing the energy of the hot electrons to be propagated through the crystal lattice of the host material to allow element ions to be excited. As a result, a light emission phenomenon appears. The emission initiation voltage and emission efficiency of the TFEL device are estimated by the mobility and energy loss of the electrons in the various stages of the emission mechanism. As one of the important loss factors there is a matching in ionic valency between the host material and the luminescence center.

Viewing the emitting layer made up of the material in Table 1 from this angle it will be seen that the compound of the host material is bivalent, such as ZnS or CaS, and that the element ion serving as the luminescence center is trivalent, such as $Sm^{3+}$ or $Tb^{3+}$. It is, therefore, not possible to obtain a matching in the ionic valence between the host material and the luminescence center. The lack of such a matching causes the element to be less likely to be incorporated in the crystal lattice of the host material in the form of ions. As a result, a collision cross-section area of hotcarriers to the luminescence center which are generated in the emitting layer is extremely decreased, prominently reducing the emission efficiency.

In the aforementioned conventional emitting layer, halogen ions, such as $F^-$ or $Cl^-$, are added to the host material and the element ion serving as the luminescence center, the element ion being different in valence number from the host material. These ions are different in valence number from the host material is allowed to be readily incorporated into the crystal of the host material. By doing so, a charge compensation is carried out. For example, $TbF_3$ is used as the luminescence center in the case where a green-light emitting layer is formed with the use of ZnS host material.

J.I. PANKOVE, et al. "LUMINESCENCE IN GaN" of "JOURANAL OF LUMINESCENCE 7 (1973) 114–126" discloses the concept of forming an emitting layer of high resistance in which Zn is added to GaN. R.F. Rutz "Ultraviolet electroluminescence in AlN" of "Appl. Phys. Lett., 28 (7) (1976) 379" discloses an emission utilizing a sole AlN. Furthermore, S. Yoshida, et al. "J. Appl. phys. 53 (10) (1982) 6844" discloses "Properties of $Al_xGa_{l-x}N$ films prepared by reaction molecular beam epitaxy".

SUMMARY OF THE INVENTION

It is accordingly an object of the present invention to provide a TFEL device including an emitting layer containing Group IIIb-Vb compound, or Group IIIb-Vb ternary compound represented by $Al_xG_{l-x}N$ ($0 < X < 1$), as a host material which readily gains a matching against positive trivalent element ions, without charge compensation, acting as an optimal luminescence center.

Another object of the present invention is to provide a TFEL device including an emitting layer which, in view of a present tendency that the use of a trivalent lanthanide ion is very effective to full color representation, comprises the aforementioned luminescence center and a host material which better acquires a matching against the luminescence center.

According to the present invention, there is provided a TFEL device which comprises an emitting layer containing Group IIIb-Vb compound as a host material and positive trivalent element ions added as a luminescence center to the host material, a dielectric layer provided on at least one surface side of the emitting layer, one electrode provided on the emitting layer or on one dielectric electrode and the other electrode provided on the other dielectric electrode.

In another aspect of the present invention, there is provided a TFEL device, comprising an emitting layer containing, as a host material, Group IIIb-Vb ternary compound represented by $Al_xGa_{l-x}N$ ($0 < X < 1$) and positive trivalent element ions added as a luminescence center to the host material, a dielectric layer formed on at least one surface side of the emitting layer, one electrode provided on the emitting layer or on one dielectric layer and the other electrode provided on the other dielectric layer.

In still another aspect of the present invention, there is provided TFEL device, comprising a light emitting layer including a first layer containing, as a host material, Group IIIb-Vb ternary compound represented by $Al_xGa_{l-x}N$ ($0 < X < 1$) and positive trivalent element ions added as a luminescence center to the host material and a second layer formed on at least one surface side of the first layer and containing the Group IIIb-Vb ternary compound and Zn added to the host material in which a diffusion region having a Zn concentration gradient is formed at a boundary between the first and second layers, a dielectric layer formed on at least one surface side of the emitting layer, one electrode provided on the emitting layer or on one dielectric layer, and the other electrode provided on the other dielectric layer.

BRIEF DESCRIPTION OF THE DRAWINGS

FIG. 1 is a cross-sectional view diagrammatically showing a TFEL device according to an embodiment of the present invention;

FIG. 2 is a cross-sectional view diagrammatically showing a TFEL device according to another embodiment of the present invention.

Figure 3:
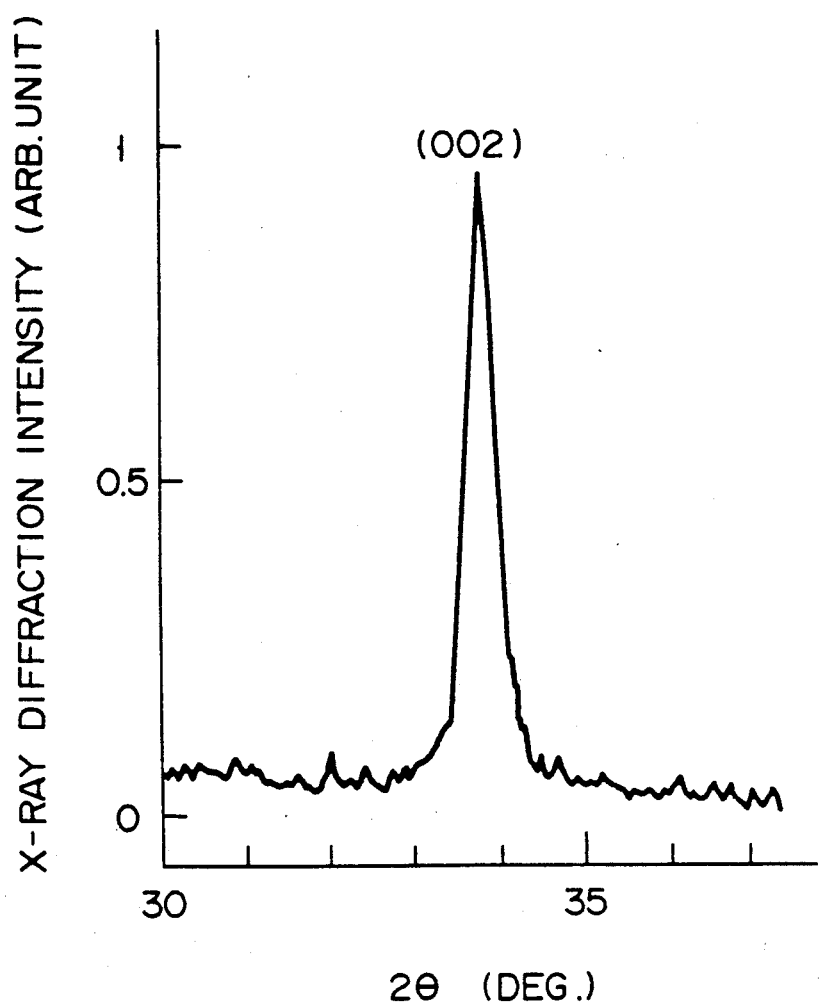
FIG. 3 is an x-ray diffraction pattern showing a crystal structure of an emitting layer which is obtained in Example 1.

A TFEL device according to the present invention will be explained below by referring to FIG. 1.

One electrode 2a is provided on a transparent substrate 1 and one dielectric layer 3a is covered on the electrode 2a. An emitting layer 4 is formed on the dielectric layer 3a. The other dielectric layer 3b is covered on the dielectric layer 3a in a manner to surround the emitting layer 4 relative to the dielectric layer 3a. The other electrode 2b is formed on the dielectric layer 3b. A power source 5 for applying a high electric field is connected across the electrodes 2a and 2b.

The transparent substrate 1 is formed of, for example, glass.

One (2a) of the electrodes 2a and 2b which is located on the side of the transparent substrate 1 is formed of a transparent electroconductive material, such as ITO. The other electrode (2b) is formed of an ordinary electroconductive material, such as Al or Cu.

The dielectric layers 3a and 3b are formed of, for example, $Ta_2O_5$, $Y_2O_3$, $Al_2O_3$, $Si_3N_4$, SiAlON, $TiO_2$, $SiO_2$, $ZrO_2$, $Nb_2O_5$, $Sm_2O_3$, $BaTiO_3$, $PbTiO_3$ and $HfO_2$. It is not always necessary to form the dielectric layers one on the upper surface side and one on the lower surface side of the emitting layer 4. It may be possible to form the dielectric layer only on one surface side of the emitting layer 4. In this case, either one the two electrodes is located directly on the surface of the emitting layer.

The emitting layer 4 contains a host material of Group IIIb-Vb compound and positive trivalent element ions added to the host material and serving as the luminescence center.

As the Group IIIb-Vb compound serving as the host material use may be made of, for example, GaN, GaP, AlN, AlP, AlAs, etc. Of these compounds, GaN, GaP and AlN are particularly effective from the standpoint of ease in handling.

As the positive trivalent element ions acting as a luminescence center use can be made of lanthanide ions, such as Tb, Tm, Sm, Pr, Ce or Eu.

If, of the Group IIIb-Vb compounds, GaN and AlN are selected for the host material, the host material acquires a matching against the lanthanide ions for allowing the emission of the primary colors: red, green and blue light. If AlP is selected from among the Group IIIb-Vb compound for the host material, the host material gains a matching against the lanthanide ions for allowing the emission of red and green light. If AlAs and GaP are selected from among the Group IIIb-Vb for the host material, the host material acquires a matching against the lanthanide ions for allowing the emission of red light.

The emitting layer 4 is formed by a sputtering method. Stated in more detail, if GaN is employed as the host material with a positive trivalent element ion as the luminescence center in the host material, a sintered mass is prepared with the positive trivalent element added to GaN and sputtering is made with the sintered mass as a target, thus obtaining an emitting layer. The sputtering step is performed in an inert gas atmosphere, such as helium, neon or argon, or in an inert gas atmosphere mixed with an nitrogen gas in any proper ratio. In such a method, sputtering is performed on that target which is a sintered mass with GaN as a host material which is much higher in melting point than Ga as a single element. Then a melted or liquid-like layer which may occur on a target of Ga can be avoided even if a target temperature is raised due to an ion impact caused during the sputtering step. It is, therefore, possible to form an excellent emitting layer with GaN as the host material. It is also possible to use glass of low heat resistance because that emitting layer can be formed at low temperature.

Another emitting layer of the device of the present invention is formed using Group IIIb-Vb ternary compound represented by

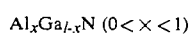

$Al_xGa_{1-x}N$ (0 < X < 1)

for the host material and positive trivalent element ions added to the host material which act as a luminescence center. Since such an emitting layer uses the Group IIIb-Vb ternary compound represented by $Al_xGa_{1-x}N$ (0 < X < 1) for the host material, it can obtain a greater band gap than an emitting layer with GaN as the host material and hence enhance the electrical resistivity. It is, therefore, possible to achieve enhanced luminance through the aforementioned emission mechanism.

The band gap of the layer of the present device has a better property than that of GaN in terms of improving the luminance on a short wavelength region. Furthermore, the electrical resistivity is exponentially increased with an increase in a value x in $Al_xGa_{1-x}N$, meaning that high voltage can be applied to the emitting layer through the aforementioned emission mechanism, It is thus possible to increase the energy of hot electrons and achieve enhanced luminance.

The aforementioned emitting layer is formed by performing sputtering on the target which is a sintered mass prepared by the addition of the lanthanide to the Group IIIb-Vb represented by $Al_xGa_{1-x}N$ (0 < X < 1).

Another TFEL device of the present invention will be explained below by referring to FIG. 2.

One electrode 2a is provided on the surface of a transparent substrate 2a and one dielectric layer 3a is covered on the electrode 2a. An emitting layer 4' is formed on the dielectric layer 3a. The other dielectric layer 3b is formed on the dielectric layer 3a in a manner to cover the emitting layer 4' relative to the dielectric layer 3a. The other electrode 2b is formed on the dielectric layer 3b. A power source 5 for applying high electric field to the emitting layer is connected to the respective electrodes 2a and 2b.

The emitting layer 4' is formed of a three-layer structure having a first layer 41 and upper and lower second layers 42b and 42a, respectively, with which the first layer 41 is sandwiched. The first layer 41 is formed of a host material of Group IIIb-Vb ternary compound represented by

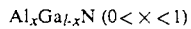

$Al_xGa_{1-x}N$ (0 < X < 1)

and positive trivalent element ions added to the host material which act as a luminescence center. The second layers 42a and 42b are formed of a host material of Group IIIb-Vb ternary compound and Zn added to the host material and act as a source for diffusing Zn ions into the first layer. A diffusion regions 43a and 43b are formed at a boundary between the first layer 41 and the second layers 42a, 42b and have a Zn concentration gradient. If N in the $Al_xGa_{1-x}N$ ($0 < X < 1$) host material is removed away from the surface of the first layer 41 by means of a heat treatment, such as "annealing", the emitting layer 4' has Zn in the diffusion regions 43a, 43b incorporated into the surface portion of the first layer 41, thus compensating for the reduction of a resistance in the first layer 41 which serves as an emitting member. A high electric field can be applied to the first layer 41, because the Zn-bearing second layers 42a and 42b are high in resistance. As a result, it is possible to, without blocking the carrier mobility of the first layer 41, enhance the electric resistivity in comparison with a single emitting layer with the Group IIIb-Vb binary compound employed as the host material. According to the present invention it is possible to achieve enhanced luminescence, through the associated emission mechanism, compared with the TFEL device having a single emitting layer with the Group IIIb-Vb ternary compound as a host material. The Zn-bearing second layer may be formed only on one surface side of the first layer, not on each side of the first layer.

The aforementioned emitting layer is prepared as will be set out below.

First, a second layer 42a is formed by performing sputtering on a target which is a sintered mass formed from a host material of Group IIIb-Vb ternary compound and Zn added to the host material. Then, a first layer 41 is formed on the second layer 42a by performing sputtering on a target which is a sintered mass formed from a host material of Group IIIb-Vb ternary compound represented by $Al_xGa_{1-x}N$ ($0 < X < 1$) and a positive trivalent element added to the host material which acts as a luminescence center. Then, a second layer 42b of the same type of the second layer 42a is formed on the first layer 41. The resultant structure is annealed to diffuse Zn in the second layers 42a, 42b into the first layer 41. By so doing, a diffusion regions 43a, 43b having a Zn concentration gradient are formed at a boundary between the first layer 41 and the second layers 42a, 42b.

A TFEL device according to the present invention may be so formed as to enhance a contrast at a time of emission as will be set forth below.

A light absorbing layer is formed on the electrode 2b, between the electrode 2b and the dielectric layer 3b or between the emitting layer 4 (or 4') and the dielectric layer 3b. For example, $Sb_2S_3$, $ZnO_x$ and $PrMnO_3$ can be listed as the light absorbing material.

A reflection preventing film utilizing a light interference effect is provided on that surface of the transparent substrate opposite to the surface on which the electrode 2a is formed.

A polarizing filter which shows a maximum value of light transmittance within a light emission spectrum range is provided on the latter surface of the transparent substrate 1. Such a polarizing filter is applied to the TFEL device for monochrome display.

According to the present invention, a TFEL device is provided which can produce desired color light from an emitting layer containing a host material of Group IIIb-Vb ternary compound, or Group IIIb-Vb ternary compound represented by $Al_xGa_{1-x}N$ ($0 < X < 1$), which readily acquires a matching against positive trivalent element ions, without charge compensation, acting as an optical luminescence center.

DETAILED DESCRIPTION OF THE PREFERRED EMBODIMENTS

The embodiments of the present invention will be explained below by referring to FIGS. 1 and 2.

EXAMPLE 1

First, Ga metal was reacted with $NH_3$ at a temperature of 1100° C. to give GaN powder.

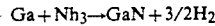

$Ga + Nh_3 \rightarrow GaN + 3/2H_2$

Then, 0.1% by weight of $Tm^{3+}$ was mixed with GaN powder and a resultant mixture was hot pressed in a $N_2$ gas atmosphere at 750° C. As a result, a sintered mass of GaN:Tm was obtained as a target having a porosity of 56%.

One electrode (transparent electrode) 2a 1700 Å in thickness of ITO was formed on a transparent substrate 1 which was formed of glass. Then one dielectric layer 3a 4000 to 5000 Å in thickness of $Ta_2O_5$ was formed on the 3a. Then, magnetron sputtering was performed, in an $Ar:N_2$ ($= 1:1$) atmosphere on a target, which was a sintered mass of the aforementioned GaN:Tm composition, to form a 4000 to 4500 Å-thick emitting layer 4 on the dielectric layer 3a, the emitting layer being of such a type that 0.1% by weight of $Tm^{3+}$ is contained in a GaN host material. The electrical resistivity of the emitting layer 4 was $2 \times 10^5 \Omega \cdot cm$. Upon analyzing the crystal structure of the emitting layer by virtue of an x-ray diffraction method, a diffraction pattern as shown in FIG. 3 was obtained, revealing that it was a polycrystalline structure having a diffraction peak at a crystallographic orientation face (002).

Then the other dielectric layer 3b 4000 to 5000 Å, in thickness of $Ta_2O_5$ was formed on the dielectric layer 3a in a manner to cover the aforementioned emitting layer 4 relative to the dielectric layer 3a. The other electrode 2b of aluminum was formed on the dielectric layer 3b to obtain a TFEL device as shown in FIG. 1.

In the TFEL device, a voltage of 120 Vrms was applied across the electrodes 2a and 2b from the power source 5 at a frequency (sine wave) 500 Hz. As a result, a blue light emission was observed having a luminance of 2 cd/m².

EXAMPLE 2

Magnetron sputtering was performed, in an $Ar:N_2$ ($= 1:1$) atmosphere, on a target which was a sintered mass of a composition GaN:Tb. A TFEL device as shown in FIG. 1 was manufactured by the same method as in Example 1, except that an emitting layer of 4000 to 4500 Å thick containing 4% by weight of $Tb^{3+}$ as a luminescence center in a GaN host material was formed by that sputtering on the dielectric layer. It has been found that the electrical resistivity of the light emitting layer 4 was $1 \times 10^6 \Omega \cdot cm$.

In the TFEL device of Example 2, a voltage of 120 Vrms was applied across the electrodes 2a and 2b from the power source 5 at a frequency (since wave) of 500 Hz. As a result a green light emission was observed having a luminance of 54 cd/m².

EXAMPLE 3

Magnetron sputtering was performed, in an $Ar:N_2$ ($= 1:1$) atmosphere, on a target which is a sintered mass of a composition GaN:Sm. A TFEL device was manufactured by the same method as in FIG. 1, except that an emitting layer 4000–4500 Å thick containing 0.5% by weight of $Sm^{3+}$ as a luminescence center in a GaN host material was formed by that sputtering on the dielectric layer. The electrical resistivity of the emitting layer 4 was $7 \times 10^5$ Ω·cm.

In the TFEL device of Example 3, a voltage was applied across the electrodes 2a and 2b from the power source 5 under the same condition as in Example 1. As a result, an orange light emission was observed having a luminance of 43 cd/m².

EXAMPLES 4 to 6

Three kinds of TFEL devices as shown in FIG. 1 were manufactured by the same method as in FIG. 1, except that their emitting layers 4 contained 0.1% of $Tm^{3+}$, 4% of $Tb^{3+}$, and 0.5% of $Sm^{3+}$, respectively, as a luminous center in an AlN host material, all of which are % by weight were formed on the dielectric layer. The electrical resistivity of the emitting layer 4 was $2 \times 10^4$ Ω·cm for the luminescence center of $Tm^{3+}$, that of the emitting layer 4 was $8 \times 10^8$ Ω·cm for the luminous center of $Tb^{3+}$ and that of the emitting layer 4 was $5 \times 10^9$ Ω·cm for the luminous center of $Sm^{3+}$.

In the TFEL devices of these Examples 4 to 6, a voltage was applied across the electrodes 2a and 2b from the power source 5 under the same condition as in Example 1. As a result, a blue, a green and an orange emission were observed for the emitting layers 4 of the Examples 4, 5 and 6, respectively. In this case, the luminance of these lights were 0.5 cd/m², 3 cd/m², and 1 cd/m², in that order.

EXAMPLE 7

A TFEL device as shown in FIG. 1 was manufactured by the same method as in Example, except that an emitting layer contained 0.3% by weight of $Pr^{3+}$, as a luminescence center, in a GaP host material was formed on the dielectric layer. The electrical resistivity of the emitting layer was $2 \times 10^{15}$ Ω·cm.

In the TFEL device of Example 7, a voltage was applied across electrodes 2a and 2b from the power source 5 under the same condition as in Example 1. As a result, a red light emission was observed having a luminance of 13 cd/m².

EXAMPLE 8

Magnetron sputtering was performed, in an $Ar:N_2$ (=1:1) atmosphere, on a target which was a sintered mass of a composition of powdered AlN and GaN in a weight ratio of AlN:GaN=2:3 with 5% by weight of $Tb^{3+}$ added thereto. A TFEL device as shown in FIG. 1 was manufactured by the same method as in Example 1, except that an emitting layer 4000 to 4500 Å thick contained 5% by weight of $Tb^{3+}$ as a luminescence center in a host material $Al_{0.35}Ga_{0.65}N$ was formed by that sputtering on the dielectric layer. The electrical resistivity of the emitting layer was $1 \times 10^7$ Ω·cm. Upon analyzing the crystal structure of the emitting layer by means of an x-ray diffraction method it was found to be a polycrystalline layer of high crystallographic orientation structure having a diffraction peak in a crystal orientation face (002).

In the TFEL device of Example 8, a voltage was applied across the electrodes 2a and 2b from the power source 5 under the same condition as in Example 1. As a result, a green light emission was obtained having a luminance of 97 cd/m².

EXAMPLE 9

Magnetron sputtering was performed, in an $Ar:N_2$ (=1:1) atmosphere, on a target which was a sintered mass of a composition $Al_{0.35}Ga_{0.65}N$:Tm. A TFEL device as shown in FIG. 1 was manufactured by the same method as in Example 1, except that an emitting layer 4000 to 4500 Å in thickness contained 0.1% by weight of $Tm^{3+}$ as a luminescence center in a host material $Al_{0.35}Ga_{0.65}N$ was formed by that sputtering on the dielectric layer. The electrical resistivity the emitting layer was $5 \times 10^7$ Ω·cm.

In the TFEL device of Example 9, a voltage was applied across the electrodes 2a and 2b from the power source 5 under the same method as in Example 1. As a result, a blue light emission was observed having a luminance of 3 cd/m².

EXAMPLE 10

Magnetron sputtering was performed, in an $Ar:N_2$ (=1:1) atmosphere, on a target which was a sintered mass of a composition $Al_{0.35}G_{0.65}N$:Sm. A TFEL device as shown in FIG. 1 was manufactured by the same method as in Example 1, except that an emitting layer contained 4% by weight of $Sm^{3+}$ as a luminescence layer in that host material ($Al_{0.35}Ga_{0.65}N$) was formed by that sputtering on the dielectric layer. The electrical resistivity of the emitting layer was $2 \times 10^7$ Ω·cm.

In the TFEL device of Example 10, a voltage was applied across the electrodes 2a and 2b from the power source 5 under the same condition as in Example 1. As a result, a red light emission was observed having a luminance of 83 cd/m².

EXAMPLE 11

Magnetron sputtering was performed, in an $Ar:N_2$ (=1:1) atmosphere, on a target of a composition $Al_{0.35}Ga_{0.65}N$:Ce. A TFEL device as shown in FIG. 1 was manufactured by the same method as in Example 1, except that an emitting layer 4000 to 4500 Å in thickness contained 1% by weight of $Ce^{3+}$ as a luminescence center in the host material $Al_{0.35}Ga_{0.65}N$ was formed by that sputtering on the dielectric layer. The electrical resistivity of the emitting layer was $3 \times 10^7$ Ω·cm.

In the TFEL device of Example 1, a voltage was applied across the electrodes 2a and 2b from the power source 5 under the same condition as in Example 1. As a result, a bluish green light emission was observed having a luminance of 25 cd/m².

EXAMPLE 12

Magnetron sputtering was performed, in an Ar:N (=1:1) atmosphere, on a target which was a sintered mass of a composition $Al_{0.35}Ga_{0.65}N$:Eu. A TFEL device as shown in FIG. 1 was manufactured by the same method as in Example 1, except that the emitting layer 4000 to 4500 Å thick contained 1% by weight of $Eu^{3+}$ as a luminescence center in the host material $Al_{0.35}Ga_{0.65}N$ in which case $Eu^{3+}$ is better in color purity than $Sm^{3+}$ was formed by that sputtering on the dielectric layer. The electrical resistivity of the emitting layer was $2 \times 10^7$ Ω·cm.

In the TFEL device of Example 12, a voltage was applied across the electrodes 2a and 2b from the power source 5 under the same condition as in Example 1. As a result, a red light emission was observed having a luminance of 57 cd/m².

In the emitting layer using $Al_{0.35}Ga_{0.65}N$ as the host material as set out above, $Pr^{3+}$ or a composite material of $Ce^{3+}$ and $Eu^{3+}$ was contained as a luminescence center. A write light emission was observed in that case.

EXAMPLE 13

One electrode (transparent electrode) 2a 1700 Å thick of ITO and one dielectric layer 3a 4000 to 5000 Å of $Ta_2O_5$ were sequentially formed on a transparent substrate which is formed of glass.

Magnetron sputtering was performed, in an $Ar:N_2$ (=1:1) atmosphere, on a target which was sintered mass containing 1% by weight of Zn in an $Al_{0.35}Ga_{0.65}N$. By so doing, a second layer 42a 1000 to 2000 Å thick containing 1% by weight of Zn in the $Al_{0.35}Ga_{0.65}N$ was formed on the dielectric layer 3a. Then, magnetron sputtering was performed, in an $Ar:N_2$ (=1:1) atmosphere, on a target which was sintered mass containing 5% by weight of $Tb^{3+}$ as a luminescence center In that host material $Al_{0.35}Ga_{0.65}N$. In this way, a first layer 41 of 4000 to 5000 Å in thickness was formed on the second layer 42a. A second layer 42b bearing Zn was formed on the first layer 41 by the same condition as the second layer 42a. Then the resultant structure was annealed in a vacuum atmosphere at 410° to 420° C. for 1 hour to form Zn diffusion regions 43a and 43b having a Zn concentration gradient at a boundary between the first layer 41 and the second layers 42a, 42b. By so doing, an emitting layer 4' was formed having the second layers 42a and 42b one on each surface of the first layer 41 and Zn diffusion regions 43a and 43b one at a boundary between the first layer 41 and the second layers 42a and 42b. The electrical resistivity of the second layers 42a and 42b was $2 \times 10^{18}$ Ω·cm. Upon analyzing the crystal structure of the first layer 41 it has been found to be a polycrystalline structure having a diffraction peak at a crystallographic orientation face (002).

The other dielectric layer 3b 4000 to 5000 Å thick of $Ta_2O_5$ was formed over the dielectric layer 3a in a manner to cover the emitting layer 4 relative to the dielectric layer 3a and then the other electrode 2b of A was formed on the dielectric layer 3b to provide a TFEL device shown in FIG. 2.

In the TFEL device of Example 13, a voltage is applied across the electrodes 2a and 2b from the power source 5 under the same condition of Example 1. As a result, a green light emission was observed having a luminance of 130 cd/m².

According to the present invention, as set forth above, a TFEL device is provided which can emit desired color light from an emitting layer containing a host material of Group IIIb-Vb compound or Group IIIb-Vb ternary compound represented by $Al_xGa_{1-x}N$ ($0 < X < 1$) which readily gains a matching against positive trivalent element ions, without charge compensation, acting as an optimal luminescence center.

What is claimed is:

1. A thin film electroluminescence device comprising:
    an emitting layer composed of a first layer containing a host material of Group IIIb-Vb ternary compound represented by $Al_xGa_{1-x}N$ ($0 < X < 1$) and positive trivalent element ions added as the luminescence center to the host material and a second layer formed on at least one surface side of the first layer and containing a host material of said Group IIIb-Vb ternary compound and Zn added to the host material and diffusion region having a Zn concentration gradient formed at a boundary between the first and second layers;
    two dielectric layers provided on surfaces of the light emitting layer;
    one electrode provided on one dielectric layer; and
    the other electrode provided on the other dielectric layer.

2. The device according to claim 1, wherein said element ions are lanthanide ions.

* * * * *